(12) United States Patent
Picher-Dempsey

(10) Patent No.: US 7,283,561 B1
(45) Date of Patent: *Oct. 16, 2007

(54) SECURE NETWORK ARCHITECTURE WITH QUALITY OF SERVICE

(75) Inventor: Heidi Picher-Dempsey, Littleton, MA (US)

(73) Assignee: Level 3 Communications, LLC, Broomfield, CO (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 1085 days.

(21) Appl. No.: 08/990,096

(22) Filed: Dec. 12, 1997

(51) Int. Cl.
*H04L 12/28* (2006.01)
*H04L 12/66* (2006.01)
*H04J 3/16* (2006.01)
*G06F 15/173* (2006.01)

(52) U.S. Cl. .................. 370/468; 370/352; 370/401; 370/395.41; 709/224; 709/226

(58) Field of Classification Search ........... 370/230, 370/231, 235, 236, 468, 400, 401, 402, 443, 370/352, 477, 230.1, 395.41, 351; 395/200.56, 395/200.7; 320/396; 709/223, 224, 203, 709/218, 219, 220, 225, 226, 229
See application file for complete search history.

(56) References Cited

U.S. PATENT DOCUMENTS

| | | | | |
|---|---|---|---|---|
| 5,732,078 A | * | 3/1998 | Arango | 370/355 |
| 5,870,562 A | * | 2/1999 | Butman et al. | 709/238 |
| 5,884,037 A | * | 3/1999 | Aras et al. | 395/200.56 |
| 5,903,559 A | * | 5/1999 | Acharya et al. | 370/355 |
| 5,903,735 A | * | 5/1999 | Kidder et al. | 395/200.7 |
| 5,933,412 A | * | 8/1999 | Choudhury et al. | 370/218 |
| 5,958,016 A | * | 9/1999 | Chang et al. | 709/229 |
| 5,968,176 A | * | 10/1999 | Nessett et al. | 713/201 |
| 5,978,373 A | * | 11/1999 | Hoff et al. | 370/392 |
| 5,995,503 A | * | 11/1999 | Crawley et al. | 370/351 |
| 6,006,264 A | * | 12/1999 | Colby et al. | 709/226 |
| 6,012,039 A | * | 1/2000 | Hoffman et al. | 705/14 |
| 6,021,263 A | * | 2/2000 | Kujoory et al. | 709/232 |
| 6,047,322 A | * | 4/2000 | Vaid et al. | 709/224 |
| 6,144,638 A | * | 11/2000 | Obenhuber et al. | 370/231 |
| 6,502,131 B1 | * | 12/2002 | Vaid et al. | 709/224 |
| 6,779,031 B1 | * | 8/2004 | Picher-Dempsey | 709/224 |

* cited by examiner

*Primary Examiner*—Hanh Nguyen
(74) *Attorney, Agent, or Firm*—Hensley Kim & Holzer, LLC

(57) ABSTRACT

In a wide area network arrangement composed of some number of secure local networks and an Internet service provider (ISP) back-bone, LAN hosts are able to indirectly access network routers, through an ISP quality of service (QoS) module, to request that information transmitted during certain specified sessions be given priority treatment by the network.

20 Claims, 5 Drawing Sheets

PROVISION SESSION SETUP

BBN) PROVISION

ADMIN | SPEED DIAL | SETUP | VIEW/REMOVE

SENDER INFO

410 { HOST NAME: 192.1.52.18    [MORE]    PROTOCOL PORT#: 0

RECEIVER INFO

420 {
UNICAST | MULTICAST

GROUP#: 224.6.2.85    [MORE]    PROTOCOL PORT#: 0
MEMBERS #S: 192.1.52.18
192.1.52.34
192.1.52.50    [MORE]

RESERVATION INFO

430 {
SESSION NAME: TRAINING        PROTOCOL: UDP
RESERVATION STYLE: ◇ FF   ◇ WF   ◇ SE
SERVICE:           ◇ RATE ◇ LOAD
BANDWIDTH (IN Kbps): 100
BURST SIZE (IN kB): 25

MISC INFO

440 {
DURATION: 2 HRS 15 MINS
USER LIST: DSHIEH
HOD
AVEITCH

[SAVE] [SETUP] [RESET]

SESSION STATUS

450 { Connection to server failed. the server is probably not running. Please contact the server administrator. dshieh@bbn.com.

[CLOSE]

FIG. 4

SECURE NETWORK ARCHITECTURE WITH QUALITY OF SERVICE

BACKGROUND OF THE INVENTION

The present invention relates generally to network communication, and more particularly to establishing dedicated and secure communication sessions over a wide area network.

Certain types of business activities create the need to transfer information in a timely and secure manner. For instance, banks periodically "backup" their computer files to a remote central database and need to know that these files were successfully copied to the remote database without having been attacked or corrupted during the process. Video conferencing is another example of an application that demands the timely and secure transmission of information (video/voice/data). Network transmission delay or the successful attack by a hacker can cause significant business problems or render applications useless.

One solution to the problem of network delay is to lease dedicated point-to-point digital data lines, such as an ISDN or T1 line, over which time critical information is sent. In addition to carrying the critical traffic, however, these lines carry traffic that is not time critical between the two end points as well. Because neither of the two traffic types is given precedence under these circumstances, time critical traffic may be delayed.

A typical solution to the precedence problem is to introduce a "priority queuing" mechanism into the network. Such queuing mechanisms give precedence to certain time critical traffic while handling the rest of the traffic on a "best effort" basis. However, both dedicated leased lines and priority queuing require a significant configuration effort, usually by the system manager. Typically, the system manager is not on site or may not even be an employee of the company using the service. As a result, the user may have no ready means to modify the configuration, which dictates that the service being provided is static in nature and not adaptable to applications where the timing of critical traffic cannot be regularly scheduled.

Another solution to the problem of network delay typically utilized by network managers is to incorporate an asynchronous transfer mode (ATM) backbone between the various local networks to handle the transfer of information. ATM was designed to provide a wide range of quality of service (QoS) capabilities. An ATM network can support some number of virtual channels (VCs) over which traffic with certain defined QoS characteristics can travel. These QoS characteristics can be used to group traffic according to precedence, and VCs can be established to transmit the different traffic types.

Using ATM interfaces to carry QoS Internet traffic, however, requires the router to map Internet protocol (IP) data flows into the VCs based on QoS characteristics. In addition, the current practice is to default to a single Permanent Virtual Channel (PVC) between routers, which does not allow for multiple service classes within the ATM net work. Although multiple PVCs are sometimes configured, there is no standard way of mapping QoS characteristics to PVCs. Also, there are no multicast PVCs, so Internet multicast traffic cannot be delivered over an equivalent PVC. Consequently, it must be duplicated and sent over separate PVCs to each multicast designation, which uses up a lot more bandwidth.

Inherently, the Internet protocol only provides for the "best effort" transmission of information. This means that all traffic is of equal precedence meaning that if there is more traffic to be transmitted than the network can handle, this traffic must be buffered in a FIFO arrangement for some period of time until it gets to the top of the buffer at which time it would be transmitted. Clearly, "best effort" transmission is not suitable for time critical traffic.

To overcome the problems of "best effort" transmission, the RSVP protocol was developed to allow an application to request QoS on the Internet and avoid delaying time critical traffic. Applications designed to employ this protocol are able to dynamically request specific QoS from a network, thereby ensuring that time critical traffic is transmitted over dedicated network resources. Specifically, the RSVP protocol reserves network bandwidth for certain traffic. Despite these benefits, the RSVP protocol is relatively new, and as a result, most applications have not been redesigned to process RSVP messages.

Security is another critical characteristic that certain types of customers demand before conducting their business over the Internet. Typically, Internet security is provided by a firewall placed between a local area network (LAN) router, or premises router, and the host computers attached to the LAN. Firewall products, such as Gauntlet, are offered commercially by TIS Co.

Because QoS-enhanced applications do not typically include security provisions, firewall type products are needed to provide application security. However, since such firewall products have not been designed to process RSVP messages, Internet security and QoS are mutually exclusive characteristics of Internet communication at the present time, even though both are desirable.

SUMMARY OF THE INVENTION

Systems and methods consistent with the present invention provide a QoS server that operates such that commercially available firewall products can be utilized by local networks to maintain security. In addition, existing commercially available IP routers can be utilized to fulfill QoS requests from secure local networks.

A server system, consistent with the present invention, includes means for receiving a session request for establishing a communication path for transmitting information, means for sending a message to an originating router in the communication path in response to the request, the message including a request to reserve resources for transmitting the information, and means for monitoring the originating router to determine whether all of the routers along the transmission path have sufficient resources to establish the communication path in accordance with the session request.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 4 is a screenshot of a session request interface consistent with the present invention.

DESCRIPTION OF THE PREFERRED EMBODIMENT

Figure 1:
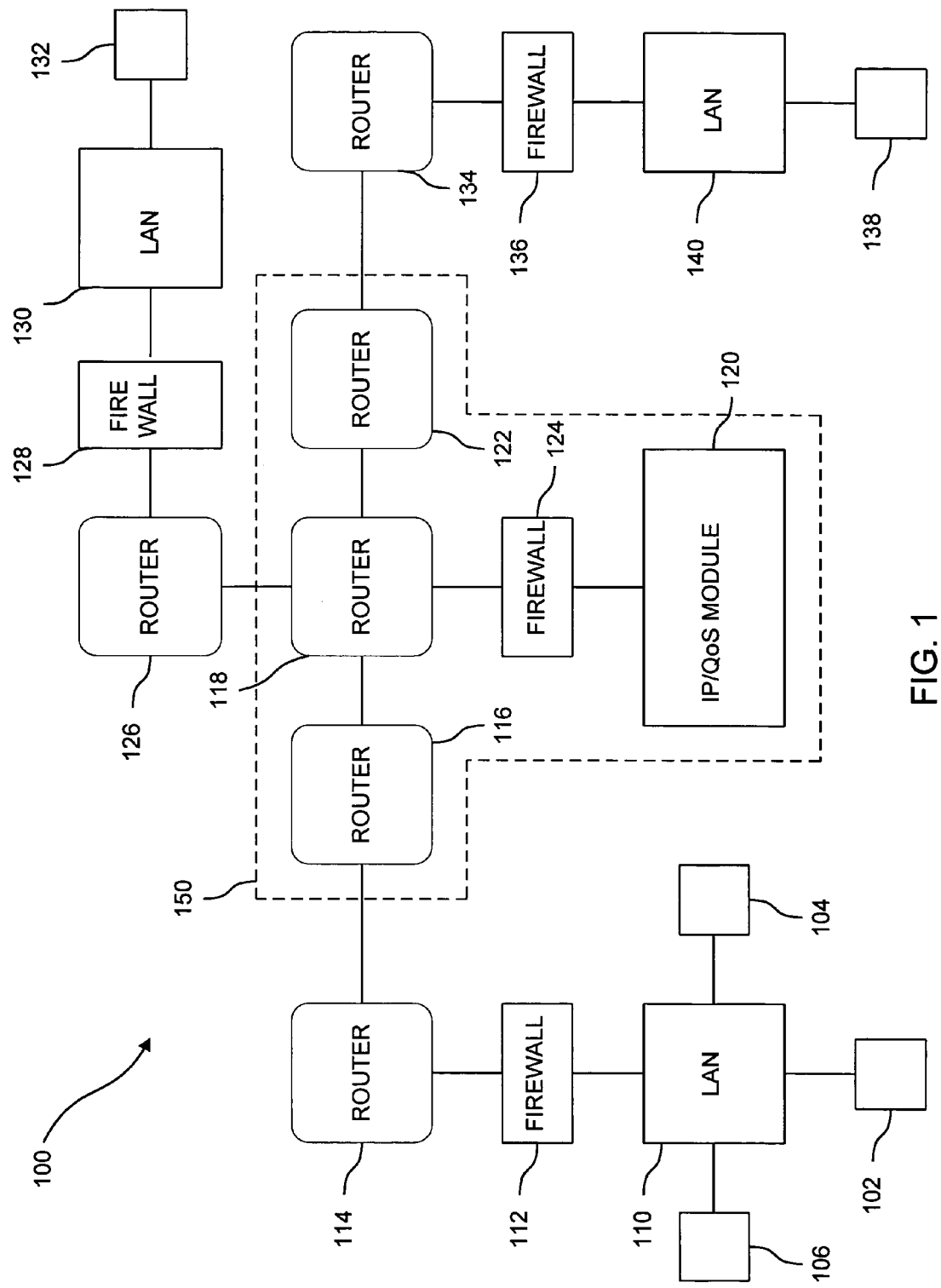
FIG. 1 is a block diagram of a secure network architecture consistent with the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

FIG. 1 is a block diagram of secure network 100 consistent with the present invention. An Internet Service Provider (ISP) maintains a wide area network (WAN) 150 to which are attached several LANs 110, 130, and 140. WAN 150 is composed of a number of interconnected WAN routers 116, 118, and 122 typically referred to as a "Backbone" and at least one IP/QoS module 120 with an associated firewall 124. WAN routers 116, 118, and 122 are RSVP capable and could be, for instance, Cisco 7507 routers running the Cisco 11.2 Internet Operating System (IOS). In addition to providing standard best-effort Internet Protocol Service, the WAN routers serve to receive packets of information from the LANs, determine whether or not the packet has been designated for QoS service, and if so, operate to transmit the packet to some destination router in a manner which provides the proper QoS.

As shown in FIG. 1, IP/QoS module 120 and associated firewall module 124 are located at a QoS hosting site of ISP 150. Firewall module 124 servers to monitor traffic to the site to ensure that all traffic comes from registered and authorized users. As mentioned previously, firewall modules are commercially available and could be composed of, for instance, an IBM/PC with IP security software (IPSEC). IP/QoS module 120 could be any workstation running, for example, the Solaris 2.5 operating system. Firewall 124 associated with IP/QoS module 120 is connected to router 118 by a communication line, such as a T1, and IP/QoS module 120 is connected to firewall 124 via a local communication line, such as an Ethernet connection.

IP/QoS module 120 serves to provide a session reservation setup application to the user upon request, to accept requests for QoS service from users, to transmit these user QoS requests to the WAN routers, to monitor the routers to determine if the QoS request has been established or not, and then notify the user of the state of the QoS request.

As also shown in FIG. 1, premises routers 114, 126, and 134 are connected to the WAN routers 116, 118, and 122, respectively, via communication lines, such as a T1 line. The premises routers serve as the "originating/destination" routers in the network. Firewall 112 is attached to premises router 114, by a local communication line, such as a T1 line, and serves to monitor traffic into LAN 110, which is connected to firewall 112 via a local communication line, such as an Ethernet connection. LAN 110 supports some number of users, which are illustrated as hosts 102, 104, and 106 in FIG. 1. Each host platform could be any personal computer or workstation computer running browser software, such as Netscape 3.0 or Internet Explorer 3.0 software. Firewalls 128 and 136 are similarly attached to premises routers 126 and 134, respectively, and monitor traffic into LANs 130 and 140, respectively. LANs 130 and 140 are shown as supporting hosts 132 and 138, respectively, although more hosts could be supported.

Figure 2:
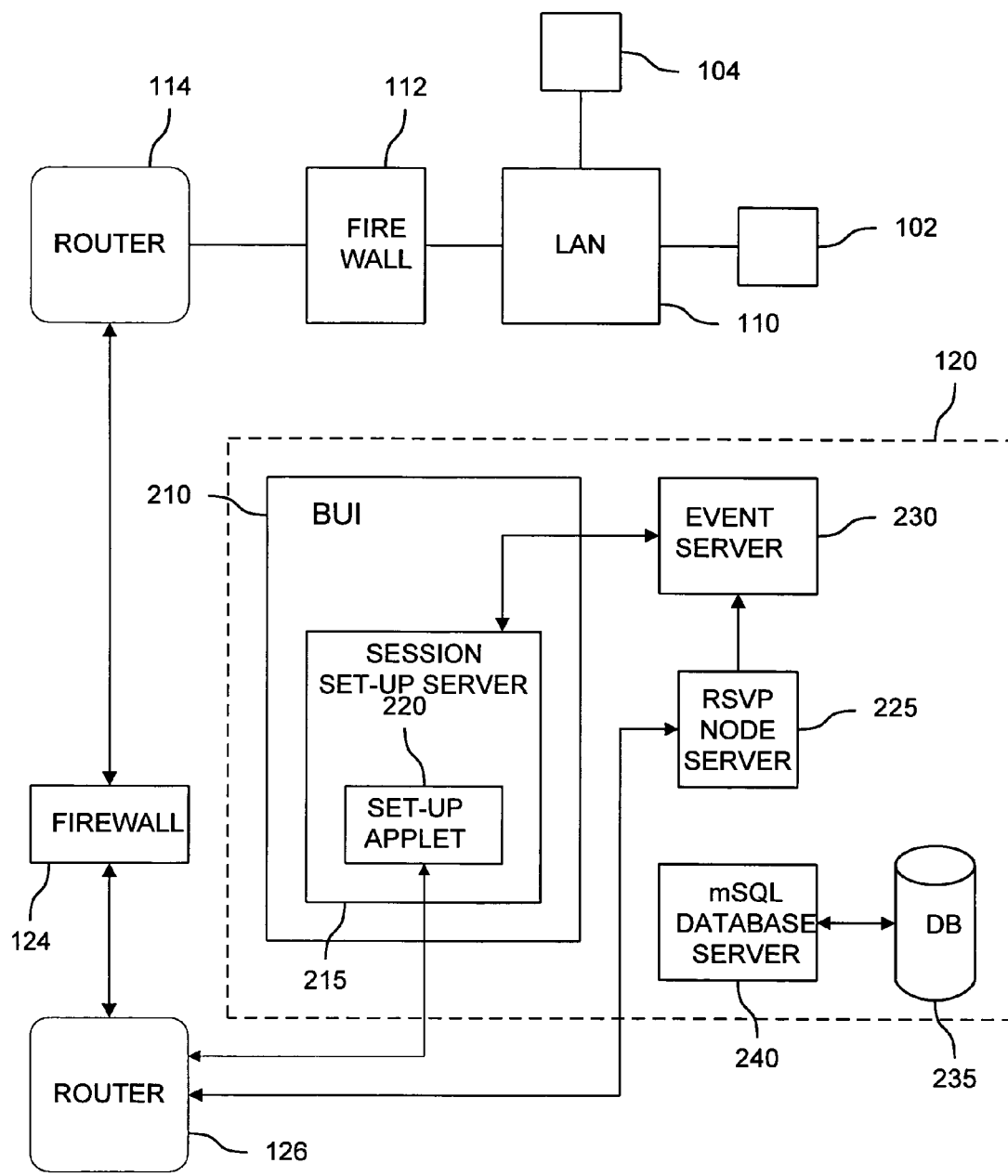
FIG. 2 is a block diagram of the IP/QoS module of FIG. 1.

FIG. 2 shows a block diagram of IP/QoS module 120 along with certain WAN and LAN elements. The LAN, hosts, firewalls, premises router, and WAN router all with interconnection communications lines are the same as described above with reference to FIG. 1. IP/QoS server module 120 includes a browser user interface (BUI) 210, a session set-up server 215 with a setup applet 220, an event server 230, an RSVP node server 225, and an mSQL Database Server 240 with a corresponding database 235.

In general, IP/QoS server module 120 executes software instructions read into a main memory from another computer-readable medium. Execution of the sequences of instructions contained in main memory causes module 120 to perform the process steps described herein. In an alternative embodiment, hard-wired circuitry may be used in place of or in combination with software instructions to implement the invention. Thus embodiments of the invention are not limited to any specific combination of hardware circuitry and software.

The term "computer-readable medium" as used herein refer to any media that participates in providing instructions for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk. magnetic tape, or any other magnetic medium, a CD-ROM, any other optical medium, punchcards, papertape, any other physical medium with patterns of holes, a RAM, PROM, and EPROM, a FLASH-EPROM, any other memory chip or cartridge, a carrier wave as described hereinafter, or any other medium from which a computer can read.

BUI 210 provides all the client functions, including the RSVP setup functionality, which are available to an authorized user based on the level of that user profile. Session setup server 215 accepts and executes requests from the host to add or remove sessions. The sessions supported include RSVP point-to-point or multi-point sessions. Session setup applet 220, included in session setup server 215, specifically enables an authorized user to setup and tear down RSVP sessions. The level of functionality within the applet depends upon the user type and realm, i.e., a logical grouping of customer sites of which the user is part.

Event Server 230 is a daemon that collects events from other QoS servers, such as RSVP node server 225, and forwards those events to other servers or client functions. Event server 230 handles user, router and multicast event types. RSVP node server 225 periodically polls routers such as router 126 and 114 to determine the state of requested sessions. The sessions supported are RSVP point-to-point or multi-point sessions. Lastly, mSQL Database Server 240 accepts all queries from the IP/QoS server modules and functions. This database is used to store all IP/QoS module information about user administration, address administration, and RSVP session tables.

As shown in FIG. 2, BUI 210 acts as an interface between the user and the IP/QoS functionality. All requests for QoS service from the user are sent to BUI 210 and all responses to these requests are then available to the user at BUI 210. Running within BUI 210, session setup server 215 permits authorized users to log onto IP/QoS module 120 and to make reservation requests. Running within session setup server 215, session setup applet 220 downloads JAVA user interface software to the host, providing a graphic interface to BUI 210.

As also shown in FIG. 2, database module 235 provides an essential back end to IP/QoS module 120. Session setup server 215 depends upon database module 235 to provide user information such as user name, password, user level (e.g. desktop user, system analyst, network operation center), access level (none, some, all), domain name, and other relevant information. Database module 235 is first accessed when the user enters BUI 210 to verify the user's name, password, user level, etc. and then again when the user submits a QoS request, to identify the domain, router names, session definitions, etc. Although database module 235 is not necessarily required to establish a QoS session, it is more preferable than establishing each session by hand.

Figure 3A:
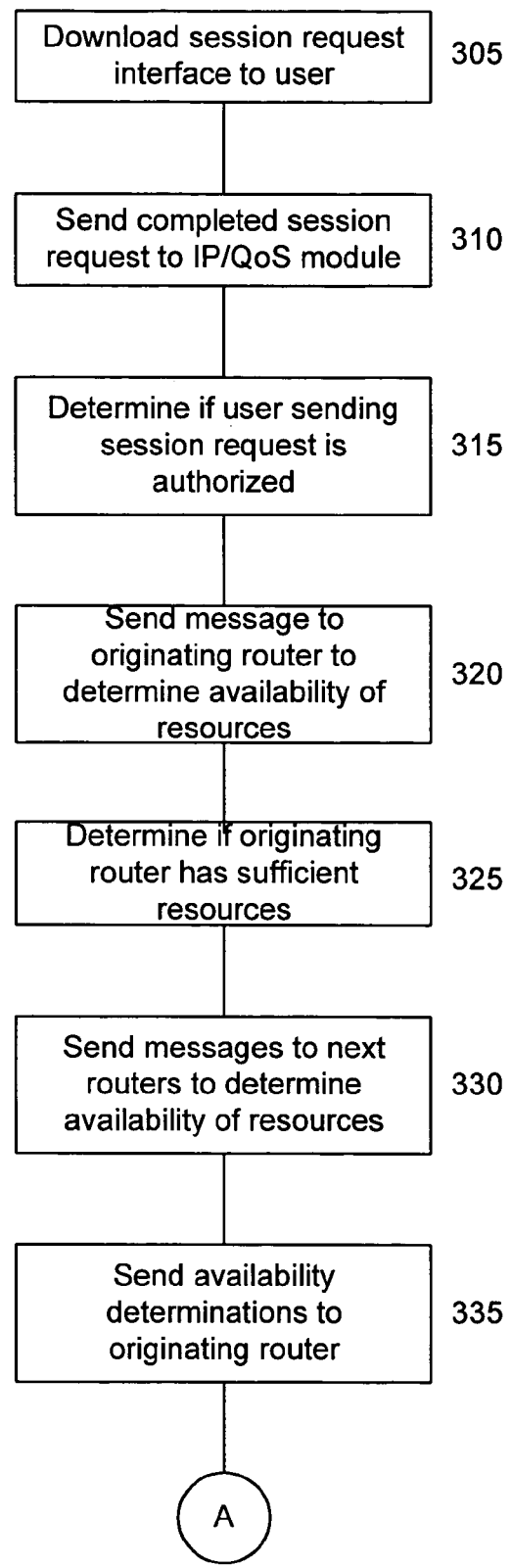
FIGS. 3A and 3B are flowcharts showing steps, consistent with the present invention, for establishing a QoS session.
Figure 3B:
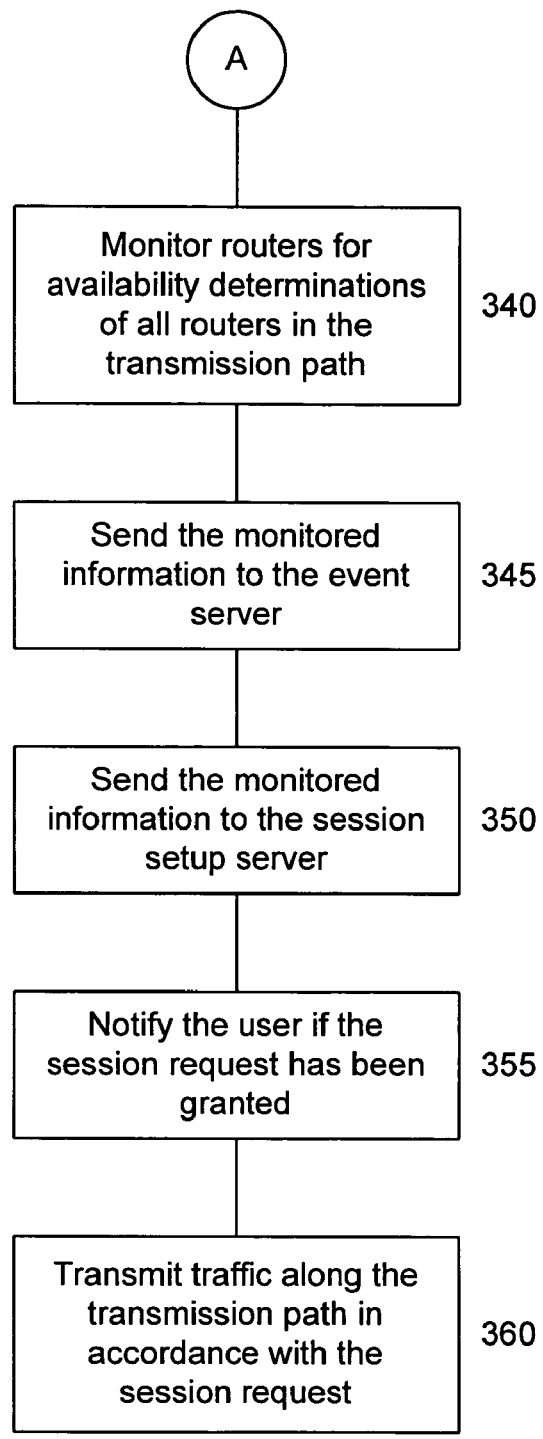

FIGS. 3A and 3B show steps, consistent with the present invention, for establishing a QoS session. First, IP/QoS module 120 responds to a user logon by downloading a JAVA applet to the user's host (step 305). This applet includes a page called the "Definition Wizard" that permits the user to define the parameters of a session. FIG. 4 shows a screenshot of an exemplary interface window for defining the parameters of the session, including sender information 410, receiver information 420, reservation information 430, miscellaneous information 440, and a session status 450.

Sender information 410 identifies the host IP address and port for the source of priority data. Receiver information 420 identifies the IP address and ports of recipients of the priority data. Reservation information 430 identifies the characteristics of the priority data, including bandwidth, RSVP service type and protocol type, for example. Miscellaneous information 440 identifies users who can access the session by login name, and sets the maximum duration of the session. Miscellaneous information 440 also allows sessions to be saved in the database, or reset. Finally, session status information 450 presents dynamic status on the state of the requested session.

Based on information entered in the Definition Wizard by the user, the host can send a QoS session request to IP/QoS module 120 (step 310). The session request is sent as a standard IP message, not as an RSVP message. Generally, the format of the packet for the session request is different from the host to the firewall and from the firewall to IP/QoS module 120. For example, the firewall may encrypt the session request packet before forwarding it to IP/QoS module 120.

After receiving the QoS session request, IP/QoS module 120 determines if the request was received from an authorized user (step 315). For example, IP/QoS module 120 may search database module 235 to determine whether the user requesting the service is authorized. In addition, IP/QoS module 120 determines if the resources necessary to fulfill the request are available. To determine the availability of the necessary resources, session setup server 215 runs an "expect" script to connect to the originating routers console. The originating router is often the premises router, such as premises router 114 shown in FIG. 2. In the event the bi-directional service is requested, session setup server 215 could contact both the originating/premises router and the destination router. The expect script causes a message to be sent from session setup server 215 to the originating router (step 320). This message, which includes information about the QoS reservation called for by the host, appears to the originating router to be a Telnet message, not an RSVP message. The information in the message includes a request for the originating router to reserve the router resources necessary to transmit traffic from the host in accordance with the QoS session request.

After receiving the message from session setup server 215, the originating router checks to see if it can provide the requested resources for the QoS session request (step 325). For example, the originating router checks if it has sufficient bandwidth available to provide the requested service. In addition, the originating router transmits messages to the next router along the transmission path to see if it has the resources to provide the requested QoS service (step 330). Each of the other routers along the transmission path determines whether it has the available resources for the QoS service and returns a message to the originating router if the router has insufficient resources (step 335).

At the same time these messages are received by the routers of the transmission path, RSVP node server 225 monitors the routers to determine the RSVP state of the routers along the transmission path, i.e., to see if the QoS service is available and was enabled (step 340). This state information is then passed to event server 230 (step 345), which in turn passes state information to session setup server 215 (step 350). If all the resources necessary for establishing the QoS session are available, the user will be notified that their QoS session request has been granted and that they can begin their session (step 355). If granted, the session proceeds, and the routers handle all traffic associated with that session according to the QoS parameters included in the QoS session request (step 360).

A network communication system, consistent with the present invention, provides for QoS sessions while maintaining network security using commercially available firewall products. In addition, QoS requests from secure local networks can be fulfilled using existing commercially available IP routers.

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method comprising:

receiving, at a quality of service (QoS) module from an originating router, a session request for establishing a QoS session for transmitting information from the originating router to a destination router, the originating and destination routers being Internet Protocol (IP) routers;

sending, from the QoS modules, a message to the originating router in response to the session request, the message including a request to reserve resources at the originating router for transmitting the information according to parameters of the QoS session; and setting up, by the QoS module, the QoS session on the transmission path between the originating and destination routers in accordance with the session request if the resources are available and reserved at the originating router;

wherein the QoS module is located at a QoS hosting site of a Wide Area Network (WAN) that is communicably coupled to the originating and destination routers.

2. The method of claim 1, wherein the QoS session establishes a pre-determined service level between the originating router and the destination router by setting the parameters for the routers to maintain during the QoS session.

3. The method of claim 1, further comprising monitoring the routers in the transmission path to determine whether the parameters of the QoS session are met.

4. The method of claim 1, wherein the session request is a standard IP message.

5. The method of claim 1, wherein the sending the message includes presenting the message to the origination router as a Telnet message.

6. The method of claim 1, wherein the QoS module maintains security in a network of the QoS session by utilizing commercially-available firewall products.

7. The method of claim 1, wherein the sending the message to the originating router further comprising sending the message to one or more other routers on the transmission path between the originating router and the destination router to determine if resources are available for the QoS session at the one or more other routers.

8. A network, comprising:
  an originating router coupled to a host in a first local area network, the originating router being an Internet Protocol (IP) router;
  a destination router coupled to another host in a second local area network, the destination router being an IP router; and
  a quality of service (QoS) module at a QoS hosting site of a Wide Area Network (WAN) communicably coupled to the originating router and the destination router to:
    receive a session request for establishing a QoS session for transmitting information from the originating router to the destination router;
    send a message to the originating router in response to the session request, the message including a request to reserve resources at the originating router for transmitting the information according to parameters of the QoS session; and
    set up the QoS session on the transmission path between the originating and destination routers in accordance with the session request if the resources are available and reserved at the originating router.

9. The network of claim 8, wherein the QoS module further comprises a session setup module for sending the message to the originating router.

10. The network of claim 8, wherein the QoS module further comprises a node server module for monitoring the routers in the transmission path to determine whether the parameters of the QoS session are met.

11. The network of claim 8, wherein the QoS session establishes a pre-determined service level between the originating router and the destination router by setting the parameters for the routers to maintain during the QoS session.

12. The network of claim 8, wherein the session request is a standard IP message.

13. The network of claim 8, wherein the QoS module sending the message to the originating router further comprising sending the message to one or more other routers on the transmission path between the originating router and the destination router to determine if resources are available for the QoS session at the one or more other routers.

14. The network of claim 13, wherein the one or more other routers determine, in response to the message, whether the resources are available and return another message to the originating router if the resources are unavailable.

15. An article of manufacture, comprising a computer-readable medium storing instructions that, when accessed by a computer, cause the computer to execute operations comprising:
  receiving, at a quality of service (QoS) module from an originating router, a session request for establishing a QoS session for transmitting information from the originating router to a destination router, the originating and destination routers being Internet Protocol (IP) routers;
  sending, from the QoS modules, a message to the originating router in response to the session request, the message including a request to reserve resources at the originating router for transmitting the information according to parameters of the QoS session; and
  setting up, by the QoS module, the QoS session on the transmission path between the originating and destination routers in accordance with the session request if the resources are available and reserved at the originating router;
  wherein the QoS module is located at a QoS hosting site of a Wide Area Network (WAN) that is communicably coupled to the originating and destination routers.

16. The article of manufacture of claim 15, wherein the computer-readable medium further includes data that cause the computer to perform operations comprising monitoring the routers in the transmission path to determine whether the parameters of the QoS session are met.

17. The article of manufacture of claim 15, wherein the session request is a standard IP message.

18. The article of manufacture of claim 15, wherein the sending the message includes presenting the message to the origination router as a Telnet message.

19. The article of manufacture of claim 15, wherein the QoS module maintains security in a network of the QoS session by utilizing commercially-available firewall products.

20. The article of manufacture of claim 15, wherein the sending the message to the originating router further comprises sending the message to one or more other routers on the transmission path between the originating router and the destination router to determine if resources are available for the QoS session at the one or more other routers.

* * * * *

UNITED STATES PATENT AND TRADEMARK OFFICE
CERTIFICATE OF CORRECTION

| | | |
|---|---|---|
| PATENT NO. | : 7,283,561 B1 | Page 1 of 1 |
| APPLICATION NO. | : 08/990096 | |
| DATED | : October 16, 2007 | |
| INVENTOR(S) | : Heidi Picher-Dempsey | |

It is certified that error appears in the above-identified patent and that said Letters Patent is hereby corrected as shown below:

Column 6, line 55, in Claim 1, delete "QoS modules" and insert --QoS module-- therefor.

Column 8, line 22, in Claim 15, delete "QoS modules" and insert --QoS module-- therefor.

Signed and Sealed this

Nineteenth Day of January, 2010

David J. Kappos
*Director of the United States Patent and Trademark Office*